United States Patent [19]
Pinschmidt, Jr. et al.

[11] Patent Number: 4,973,410
[45] Date of Patent: Nov. 27, 1990

[54] CROSSLINKED VINYLAMINE POLYMER IN ENHANCED OIL RECOVERY

[75] Inventors: Robert K. Pinschmidt, Jr., Allentown; Bheema R. Vijayendran, Emmaus, both of Pa.

[73] Assignee: Air Products and Chemicals, Inc., Allentown, Pa.

[21] Appl. No.: 443,304

[22] Filed: Nov. 29, 1989

[51] Int. Cl.$^5$ .................. C09K 7/02; E21B 43/00
[52] U.S. Cl. ...................... 252/8.551; 252/8.553
[58] Field of Search .................. 252/8.551, 8.553

[56] References Cited

U.S. PATENT DOCUMENTS

| 4,059,552 | 11/1977 | Zweigle et al. | 260/29.6 TA X |
|---|---|---|---|
| 4,518,745 | 5/1985 | Engelhardt et al. | 525/326.6 X |
| 4,579,667 | 4/1986 | Echt et al. | 252/8.55 |
| 4,604,217 | 8/1986 | Lukach | 252/8.551 |
| 4,623,699 | 11/1986 | Brunnmueller et al. | 525/355 |
| 4,690,219 | 9/1987 | Burns et al. | 166/307 |
| 4,744,418 | 5/1988 | Sydansk | 166/270 X |
| 4,778,607 | 10/1988 | Arabright et al. | 252/8.551 |
| 4,822,500 | 4/1989 | Dobson, Jr. et al. | 252/8.551 |
| 4,843,118 | 6/1989 | Lai et al. | 524/555 |
| 4,845,134 | 7/1989 | Mumallah et al. | 523/130 X |
| 4,865,129 | 9/1989 | Ryles | 166/295 X |
| 4,896,723 | 1/1990 | Hoskin et al. | 166/272 X |

FOREIGN PATENT DOCUMENTS 2110698  6/1983  United Kingdom ............. 252/8.551

Primary Examiner—Robert L. Stoll
Assistant Examiner—Chhaya Sayala
Attorney, Agent, or Firm—Mark L. Rodgers; William F. Marsh; James C. Simmons

[57] ABSTRACT

The production of oil or gas from a subterranean formation is enhanced by injecting into the formation, such as in acidized fracturing, an aqueous fluid containing as a viscosifier a crosslinked vinylamine polymer. Acidizing fluids are provided containing HCl and a viscosifying amount of a gel of the crosslinked polymer, preferably poly(vinylamine) crosslinked with a diisocyanate, a polyepoxide or epichlorohydrin.

8 Claims, No Drawings

CROSSLINKED VINYLAMINE POLYMER IN ENHANCED OIL RECOVERY

FIELD OF INVENTION

This invention relates to a method of enhancing the production of oil or gas using a viscosifying agent based upon crosslinked vinylamine polymer. In another aspect it relates to an acidized fracturing fluid for use in enhanced oil or gas recovery containing a crosslinked vinylamine polymer.

BACKGROUND OF THE INVENTION

Polymers are used in a wide variety of ways to enhance the production of oil or gas from underground formations. Usually the function of the polymer is to control the viscosity of the aqueous fluids which are injected into the formation. For example, in water flooding the efficiency of the water flood is improved by adding a water soluble polymer to the aqueous phase and thereby decreasing the mobility difference between the injected water and the oil in place. Polymers are also used in acidizing and/or fracture acidizing in which acidic compositions are used to stimulate production of hydrocarbon from underground formations by increasing the formation porosity. A water soluble or water dispersible polymer is incorporated to increase the viscosity of the fluid so that wider fractures can be developed and live acid can be forced farther into the formations. This increases the proppant carrying capacity of the acid solutions and permits better fluid loss control.

Generally high molecular weight polymers (those having a molecular weight on average of at least $10^6$) or polymers with various gelling or crosslinking agents are used for this purpose. Most commercially available polymeric viscosifiers, however, are degraded by the hostile reservoir environment including high temperatures, acidity and extreme shear conditions, as well as by the electrolytes which are encountered in the oil recovery process. For example, hydrolyzed polyacrylamides fail in sea water solution at elevated temperatures due to precipitation of the polymer in the presence of calcium ions in the sea water. Xanthan polymers are insensitive to calcium ions but these polymers degrade at high temperatures and lose their viscosifying efficiency.

U.S. Pat. No. 4,579,667, Echt, et al. (1986) discloses gelled aqueous compositions containing an anionic partially hydrolyzed acrylamide and a water-soluble cationic polyamide-epihalohydrin resin useful in fracturing oil and gas formations in enhanced oil recovery. The invention is said to eliminate the need to use polyvalent metal salts and complexes in order to convert a water-soluble polymer to a crosslinked gel. Gels can be used to suspend propping agents, to reduce water loss by serving as a plugging agent, and as a "pusher" in surfactant flooding.

U.S. Pat. No. 4,690,219, Burns, et al. (1987) discloses acidizing well stimulation for oil production using an acid solution thickened with a copolymer of an N-vinyl lactam, such as N-vinyl-2-pyrrolidone, and an α, β-unsaturated amide, such as acrylamide. The thickening polymer operates in the absence of a crosslinking agent, and is said to function in hostile formation environments including temperatures above 170° F. Aldehydes are disclosed, however, as suitable crosslinking agents to form a gel.

It is known that crosslinked polyvinylamines can be prepared in various ways. For example, Japanese Patent Publication No. J61051007-A (1986) discloses making a crosslinked poly(vinylamine) by copolymerizing N-vinylformamide with a copolymerizable crosslinkable monomer and then hydrolyzing the amide groups to amine. Japanese Patent Publication No. J61051006-A (1986) discloses, on the other hand, suspending a polyvinylamine in a dispersion medium and then crosslinking the polymer by reacting it with a dialdehyde or epichlorohydrin.

The preparation of polyvinylamines by hydrolysis of N-vinylformamide polymers is likewise well known. U.S. Pat. No. 4,623,699, Brunnmueller, et al. (1986) discloses making poly(vinylamines) by eliminating formyl groups from a polymer formed from N-vinylformamide using gaseous hydrogen chloride in the presence of not over 5 wt. % water, based on the polymer.

This application is related to U.S. Pat. No. 4,843,118 of Lai and Vijayendran which issued June 27, 1989, based on application Ser. No. 64,962 filed June 19, 1987. This patent discloses an acidized fracturing fluid containing poly(vinylamine) obtained by at least 50% hydrolysis of a poly(vinylamide) having a molecular weight of at least $10^6$. Background patents are referenced as disclosing methods for making poly(vinylamines) having lower molecular weights, normally involving solution polymerization. Crosslinking agents are optional and include organic titanate complexes, epichlorohydrin, hexamethylene diisocyanate, glyoxal, butanediol diacrylate, terephthaldehyde and glutaraldehyde. The disclosure of this patent, which is incorporated herein by reference, was filed as a continuation-in-part of Ser. No. 914,046, filed Oct. 1, 1986. This parent application and a related European Patent Application No. 0,264,649, published April 24, 1988, disclose the preparation of poly(vinylamines) having at least $10^6$ average molecular weight by using either acid or base hydrolysis of poly(N-vinylformamide). The polymerization technique used is inverse emulsion polymerization. Among the utilities disclosed for such high molecular weight amines are uses in drilling mud compositions, cements for drilling holes, completion fluids, acidized fracturing fluids and general use in enhanced oil recovery. The parent application and the European patent application do not, however contain the disclosure found in the '118 patent concerning the use of crosslinking agents which can be incorporated into acidized fracturing fluids for well stimulation when such fluids contain high molecular weight poly(vinylamine). Application Ser. No. 914,046 is abandoned but the corresponding disclosure was filed in foreign countries and issued as Taiwan Patent No. 31922 on Aug. 10, 1989.

It is highly desirable to develop polymer gels which are stable and can be used as plugging agents in enhanced oil recovery. Such polymer gels are placed in high permeability zones in a formation so that subsequently injected treatment fluid is forced into the low permeability zones thereby giving better sweep efficiency by increasing the contact of the flooding fluid with the oil bearing reservoir sands.

BRIEF SUMMARY OF THE INVENTION

We have found that vinylamine polymers over a broad range of molecular weights can be crosslinked and used effectively because of their demonstrated stability under harsh environmental conditions in enhanced oil recovery. These polymers demonstrate good stability at high temperatures under acid conditions and high electrolyte concentrations and are particularly suitable for use in acid or matrix fracturing of oil or gas bearing formations. Accordingly our invention provides a method of enhancing the production of oil or gas from a subterranean formation by injecting into the formation a fluid which contains as a viscosifier a vinylamine polymer which has been crosslinked with either a multi-functional organic compound or an inorganic compound containing multi-valent anions such as titanates, zirconates, phosphates, silicates, etc. or an inorganic cation such as $Cu^{+2}$, $Fe^{+3}$, $Fe^{+2}$, $Zn^{+2}$, etc. which is capable of complexing with said vinylamine polymer. The crosslinked vinylamine polymer has greatly increased viscosity and preferably is in the form of a gel. Crosslinking agents which are particularly advantageous are diepoxides and diisocyanates.

The invention also provides an acidized fracturing fluid which is suitable for use in enhanced oil or gas recovery and comprises water, an acidizing amount of hydrochloric acid and a viscosifying amount of the crosslinked vinylamine polymer described above. By using the crosslinking agent to form high viscosity polymers or, preferably, polymer gels, the original vinylamine polymer can have a molecular weight substantially less than $10^6$ as required in U.S. Pat. No. 4,843,118.

DETAILED DESCRIPTION OF THE INVENTION

Poly(vinylamines) can be prepared by a variety of different methods as referenced above in the background of the invention. The molecular weight of the poly(vinylamines) used in this invention can range from as low as 100,000 to 10 million or more, but is preferably in the range of about 0.5 to 1 million. The preferred method of making these poly(vinylamines) is by hydrolysis of a poly(N-vinylformamide). It is within the scope of this invention, however, to use copolymers of vinylacetate and N-vinylformamide which on hydrolysis, either in a single or two-phase procedure, produce a copolymer containing poly(vinyl alcohol) linkages and poly(vinylamine) linkages. Polymers which contain 25% or more of their vinyl linkages as a poly(vinylamine) can be crosslinked and used to practice this invention as described and it is intended that the term, vinylamine polymer, encompass such copolymers containing the vinylamine monomer linkages with or without copolymerized monomer containing the vinyl alcohol units. Also within the scope of this invention are the use of such polymers containing vinylamine units in which the parent polymer is not completely hydrolyzed and, for example, contains up to 15 mol % but preferably not over 4 mol % of the polymerized vinyl units containing the original amide or formyl groups. If a polymer is formed with vinylacetate as a comonomer the polymer could also contain unhydrolyzed acetate groups in approximately the same limited amounts.

The crosslinking agents which can be used are either multi-functional organic compounds such as dialdehydes, polyepoxides, di- or triacrylates, di- or triisocyanates or dihalides, or inorganic compounds containing multi-valent anions or inorganic cations which are capable of complexing with poly(vinylamine). Among these agents it is preferred to form polymer gels with either the diepoxides or diisocyanates as the gels formed with these crosslinking agents show higher stability than those formed with the dialdehydes, dihalides, or diacrylates. This stability is exhibited in acid solution at high temperatures such as would be encountered by a well injection fluid at bottom-hole conditions of an oil or gas producing well.

The viscosity of the polymer solution which is used to form the injection fluids depends on the molecular weight, the concentration of the poly(vinylamine), the degree of crosslinking, pH and electrolyte concentrations. Poly(vinylamines) with very high molecular weights exceeding $10^6$ at high concentrations can give a desired viscosifying effect in the absence of crosslinkers as described in our U.S. Pat. No. 4,843,118. We have found, however, that in order to prepare the vinylamine polymer gels which are found especially desirable, suitable amounts of crosslinker are required. The amounts of crosslinker to be used ranges from 0.01 to about 30 mol % relative to homopolymer amine groups, and from 0.01 to about 50 mole % of the amine content of vinylamine copolymers. The thermal stability of the vinylamine polymer gels depends upon the strength of these crosslinking bonds. We have found quite surprisingly that medium molecular weight poly(vinylamines), for example those having a molecular weight above 100,000 but less than 1 million, can be converted to polymer gels by crosslinking, and especially by crosslinking with diisocyanates or diepoxide compounds, and that such gels are quite stable in acid solution at high temperatures.

The concentration of the polymer gel or crosslinked polymer in the well-treating fluid depends on the molecular weight of the polymer and the crosslink density, but it is generally in the range of about 0.01 to 10 wt % of the well-treating fluid and preferably in the range of 0.1 to about 5 wt %.

In order to describe our invention further the following examples are presented which are meant to be illustrative only and not to limit unduly the scope of our invention.

EXAMPLE 1

Preparation of poly(vinylamine)

N-vinylformamide (NVF) was polymerized to form an aqueous solution of poly-NVF. To a 22 L three-necked round-bottomed flask were charged 900 g of NVF, 8.1 kg of $H_2O$ and 3.15 g of Vazo 52 (2,2'-azobis(2,4-dimethyl pentanenitrile) from E. I. DuPont de Nemours & Co.). The solution pH was adjusted to 8.5 with $NH_4OH$. The polymerization was carried out at 60° C. for 4 hours under a nitrogen atmosphere.

The aqueous poly-NVF solution thus obtained was mixed with an equimolar amount of 50% aqueous NaOH solution. The resulting mixture was heated for 8 hours at 80° C. under a nitrogen atmosphere. To the reaction mixture was added concentrated hydrochloric acid (~3 L) until the polymer precipitated. The acid solution was decanted. The precipitated polymer was redissolved in water and reprecipitated with methanol (~20 gallons for 1 kg of polymer). The polyvinylamine had a weight average molecular weight of 600,000.

EXAMPLE 2

Crosslinking poly(vinylamine)

Poly(vinylamine . HCl) prepared in Example 1 was dissolved in water to give a 2.5 weight % solution. Brookfield viscosity of the stock solution was 330 cps at pH of 6.5. To separate portions of this solution was added 5 mole % (unless otherwise indicated) based upon the polymer of nine different crosslinking agents and NaOH was added in amounts necessary to obtain the desired solution pH. The resulting solutions were stirred at room temperature for 1 hour after which solution viscosity was measured by using a Brookfield Viscometer. Results with various crosslinkers are given in Table 1.

TABLE 1

| Crosslinker | pH | Temp. (°C.) | Viscosity (cps) |
|---|---|---|---|
| Glutaraldehyde | 3 | 25 | gel (immediately) |
| Glutaraldehyde | 4 | 25 | gel (immediately) |
| Glutaraldehyde | 5 | 25 | gel (immediately) |
| Glutaraldehyde | 6 | 25 | gel (immediately) |
| Glutaraldehyde | 7 | 25 | gel (immediately) |
| Glutaraldehyde | 8 | 25 | gel (immediately) |
| Glutaraldehyde | 9 | 25 | gel (immediately) |
| Glutaraldehyde | 10 | 25 | gel (immediately) |
| Glutaraldehyde | 11 | 25 | gel (immediately) |
| Butanediol Diacrylate | 3 | 25 | 476 |
| Butanediol Diacrylate | 4 | 25 | 398 |
| Butanediol Diacrylate | 5 | 25 | 484 |
| Butanediol Diacrylate | 6 | 25 | 354 |
| Butanediol Diacrylate | 7 | 25 | 396 |
| Butanediol Diacrylate | 8 | 25 | gel (60 min.) |
| Butanediol Diacrylate | 9 | 25 | gel (20 min.) |
| Butanediol Diacrylate | 10 | 25 | gel (10 min.) |
| Butanediol Diacrylate | 11 | 25 | gel (10 min.) |
| Butanediol Diacrylate | 6 | 90 | gel (30 min.) |
| Butanediol Diacrylate | 7 | 90 | gel (10 min.) |
| Diisocyanatohexane | 3 | 25 | 540[1] |
| Diisocyanatohexane | 4 | 25 | 678[1] |
| Diisocyanatohexane | 5 | 25 | gel (30 min.) |
| Diisocyanatohexane | 6 | 25 | 900 |
| Diisocyanatohexane | 7 | 25 | 460 |
| Diisocyanatohexane | 8 | 25 | 178 |
| Diisocyanatohexane | 9 | 25 | 116 |
| Diisocyanatohexane | 10 | 25 | 68 |
| Diisocyanatohexane | 11 | 25 | 62 |
| Epichlorohydrin | 3 | 25 | 410 |
| Epichlorohydrin | 4 | 25 | 324 |
| Epichlorohydrin | 5 | 25 | 346 |
| Epichlorohydrin | 6 | 25 | 306 |
| Epichlorohydrin | 7 | 25 | 194 |
| Epichlorohydrin | 8 | 25 | 150 |
| Epichlorohydrin | 9 | 25 | 106 |
| Epichlorohydrin | 10 | 25 | gel (105 min.) |
| Epichlorohydrin | 11 | 25 | gel (30 min.) |
| Epichlorohydrin | 9 | 90 | gel (10 min.) |
| Hylite HF[2] | 3 | 25 | 858 |
| Hylite HF | 4 | 25 | 646 |
| Hylite HF | 5 | 25 | 446 |
| Hylite HF | 6 | 25 | 330 |
| Hylite HF | 7 | 25 | 256 |
| Hylite HF | 8 | 25 | 182 |
| Hylite HF | 9 | 25 | 140 |
| Hylite HF | 10 | 25 | 124 |
| Hylite HF | 11 | 25 | 822 |
| Hylite HF | 7 | 90 | 1048[3] |
| Hylite HF | 8 | 90 | gel (60 min.) |
| Cymel 303[4] | 3 | 25 | 446 |
| Cymel 303 | 4 | 25 | 724 |
| Cymel 303 | 5 | 25 | 426 |
| Cymel 303 | 6 | 25 | 310 |
| Cymel 303 | 7 | 25 | 248 |
| Cymel 303 | 8 | 25 | 190 |
| Cymel 303 | 9 | 25 | 124 |
| Cymel 303 | 10 | 25 | 66 |
| Cymel 303 | 11 | 25 | 58 |
| Dimethyl adipate | 3 | 25 | 578 |
| Dimethyl adipate | 4 | 25 | 484 |
| Dimethyl adipate | 5 | 25 | 308 |
| Dimethyl adipate | 6 | 25 | 236 |
| Dimethyl adipate | 7 | 25 | 218 |
| Dimethyl adipate | 8 | 25 | 164 |
| Dimethyl adipate | 6 | 75 | 796 |
| Tyzor AA[5] | 3 | 25 | 738 |
| Tyzor AA | 4 | 25 | 620 |
| Tyzor AA | 5 | 25 | gel (20 min.) |
| Tyzor AA | 6 | 25 | gel (20 min.) |
| Tyzor AA | 7 | 25 | gel (20 min.) |
| Glyoxal[6] | 3 | 25 | 352 |

TABLE 1-continued

| Crosslinker | pH | Temp. (°C.) | Viscosity (cps) |
|---|---|---|---|
| Glyoxal | 4 | 25 | 450 |
| Glyoxal | 5 | 25 | 468 |
| Glyoxal | 6 | 25 | gel (immediately) |
| Glyoxal | 7 | 25 | gel (immediately) |
| Glyoxal | 8 | 25 | gel (immediately) |
| Glyoxal | 9 | 25 | gel (immediately) |
| Glyoxal | 10 | 25 | gel (immediately) |
| Glyoxal | 11 | 25 | gel (immediately) |
| Glyoxal | 3 | 90 | gel (60 min.) |
| Glyoxal | 4 | 90 | gel (60 min.) |

[1]gel overnight at 25° C.
[2]Hylite HF is a partially alcohol protected N,N'dihydroxymethyl-4,5-dihydroxyethyleneurea.
[3]gel overnight but still flows.
[4]Cymel 303 is a hexamethoxymethyl melamine resin from American Cyanamid.
[5]Tyzor AA is organic titanate from DuPont and was added in 2 mole % proportions instead of 5 mole %.
[6]Added in 10 mole % proportions instead of 5 mole %.

EXAMPLE 3

A procedure as described in Example 2 was followed to show the effect of various levels of the crosslinking agent, glutaraldehyde, which produced gels immediately at a 5 mole percent level (see Table 1).

A 2.5 wt. % solution of the poly(vinylamine) of Example 1 was used. The temperature was 25° C. and the pH was 6. Results are given in Table 2.

TABLE 2

| GLUTARALDEHYDE (Mole %) | VISCOSITY (cps) |
|---|---|
| 0 | 332 |
| 0.5 | 1,380 |
| 1 | 11,500 |
| >2% | GEL |

These data show that viscosity of the poly(vinylamine) solution and gel production can be easily controlled by the proportion of crosslinker added.

EXAMPLE 4

A procedure as described in Example 2 was followed to show the effect of polymer concentration on polymer solution viscosity. Glutaraldehyde was added at a 5 mole percent level as in Example 2, using a temperature of 25° C. and a pH of 6. As shown in Table 1, with a polymer concentration of 2.5 weight percent, this level of crosslinker formed a gel immediately. The polymer used in this example was also poly(vinylamine) having a molecular weight before crosslinking of 600,000. Results are given in Table 3.

TABLE 3

| Polymer Concentration (weight %) | VISCOSITY (cps) |
|---|---|
| >1.5% | GEL |
| 0.5% | 206 |

The above data show that solution viscosity can also be controlled by adjusting the level of the poly(vinylamine). The viscosity of the 0.5 wt % solution before crosslinking the polymer was 30 cps.

EXAMPLE 5

The stability of poly(vinylamine) gels made with various crosslinkers was tested by immersing the polymer gels in 1.5N HCl acid solution at 90° C. The polymer gels were made by the procedures described in Examples 1 and 2. The results summarized in Table 4 show that the poly(vinylamines) crosslinked with diisocyanatohexane and diepoxides formed more stable gels than those formed with the other crosslinking agents tested.

TABLE 4

| STABILITY OF POLY(VINYLAMINE) GEL | |
|---|---|
| CROSSLINKER | GEL |
| Glyoxal | BREAK |
| Butanediol diacrylate | BREAK |
| Epichlorohydrin | BREAK |
| Diisocyanatohexane | STABLE |
| Tyzor AA | BREAK |
| Diepoxides | STABLE |

EXAMPLE 6

Crosslinked polymer gels were prepared from a copolymer of vinyl alcohol and vinylamine prepared by copolymerizing vinyl acetate and N-vinylformamide followed by hydrolysis of the acetate group to alcohol groups and hydrolysis of the amide groups to amine. The copolymer contained 30 mole percent vinylamine units and had a weight average molecular weight of 36,000. To an aqueous solution of 2.5 weight percent of the copolymer (PVOH/30% PVAm) was added various amounts of butanediol diacrylate (BD) at 90° C. and a pH of 9. The time required for a gel to form in each case is reported in Table 5.

TABLE 5

| Mole % BD Based on Polymer | Gel Time (min) |
|---|---|
| 20% | 20 |
| 30% | 15 |

TABLE 5-continued

| Mole % BD Based on Polymer | Gel Time (min) |
|---|---|
| 40% | 10 |

The above data show that even relatively low molecular weight polymers containing only 30 mole percent amine units can be converted to gels by crosslinking. Such polymers in their gelled state are useful in our invention.

Other aspects and embodiments of our invention will be apparent to those skilled in the art without departing from the spirit or scope of our invention.

We claim:

1. An acidified fracturing fluid suitable for use in enhancing oil or gas recovery from an oil or gas bearing formation comprising water, an acidifying amount of hydrochloric acid and a viscosifying amount of a vinylamine polymer crosslinked with a multi-functional organic compound or an inorganic compound containing multi-valent anions or an inorganic compound capable of complexing with said poly(vinylamine).

2. The composition of claim 1 wherein said polymer is poly(vinylamine).

3. The composition of claim 2 wherein said poly(vinylamine) prior to crosslinking has an average molecular weight less than $10^6$.

4. The composition of claim 2 wherein said crosslinked poly(vinylamine) forms a gel.

5. The composition of claim 4 wherein said compound used for crosslinking is a polyepoxide or epichlorohydrin.

6. The composition of claim 4 wherein said compound used for crosslinking is a diisocyanate.

7. The composition of claim 1 wherein said polymer is a copolymer of vinyl alcohol and vinyl amine.

8. The composition of claim 1 wherein said multi-valent anions are selected from the group consisting of titanates, zirconates, phosphates and silicates.

* * * * *